United States Patent
Ding

(10) Patent No.: US 12,184,824 B2
(45) Date of Patent: Dec. 31, 2024

(54) IMAGE FORMING CONTROL METHOD AND DEVICE THEREOF, AND IMAGE FORMING DEVICE

(71) Applicant: Zhuhai Pantum Electronics Co., Ltd., Zhuhai (CN)

(72) Inventor: Dajun Ding, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 236 days.

(21) Appl. No.: 17/877,237

(22) Filed: Jul. 29, 2022

(65) Prior Publication Data

US 2023/0094654 A1 Mar. 30, 2023

(30) Foreign Application Priority Data

Sep. 24, 2021 (CN) .......................... 202111122292.2

(51) Int. Cl.
*H04N 1/44* (2006.01)
*G06F 21/00* (2013.01)
*G06F 21/32* (2013.01)
*H04N 1/00* (2006.01)
*H04N 1/32* (2006.01)

(52) U.S. Cl.
CPC .......... *H04N 1/4433* (2013.01); *G06F 21/00* (2013.01); *H04N 1/00204* (2013.01); *H04N 1/00888* (2013.01); *H04N 1/00904* (2013.01); *H04N 1/32101* (2013.01); *H04N 2201/0049* (2013.01)

(58) Field of Classification Search
CPC ............ H04N 1/4433; H04N 1/00204; H04N 1/00888; H04N 1/00904; H04N 1/32101; H04N 2201/0049; G06F 21/00; G06F 21/32
See application file for complete search history.

(56) References Cited

U.S. PATENT DOCUMENTS

| | | | |
|---|---|---|---|
| 2011/0037564 A1* | 2/2011 | Wong | G06F 21/32 340/5.83 |
| 2017/0147039 A1* | 5/2017 | Peana | G06F 1/1656 |
| 2018/0270106 A1* | 9/2018 | Ou | H04L 41/14 |

OTHER PUBLICATIONS

Universal serial bus based software attacks and protection solutions by Syed et al., published 2011. (Year: 2011).*

* cited by examiner

*Primary Examiner* — Vu V Tran
(74) *Attorney, Agent, or Firm* — ANOVA LAW GROUP, PLLC

(57) ABSTRACT

An image forming control method is applied to an image forming device. The image forming device includes a communication port. The communication port includes a USB port, a wired network port, and a wireless network port. The method includes performing a forced disconnection event for the communication port in response to a satisfaction of a preset condition. The forced disconnection event includes disconnecting power supply of at least one part of components of a wireless network module, disconnecting power supply of at least one part of components of a wired network module, and force-disconnecting the USB port.

17 Claims, 3 Drawing Sheets

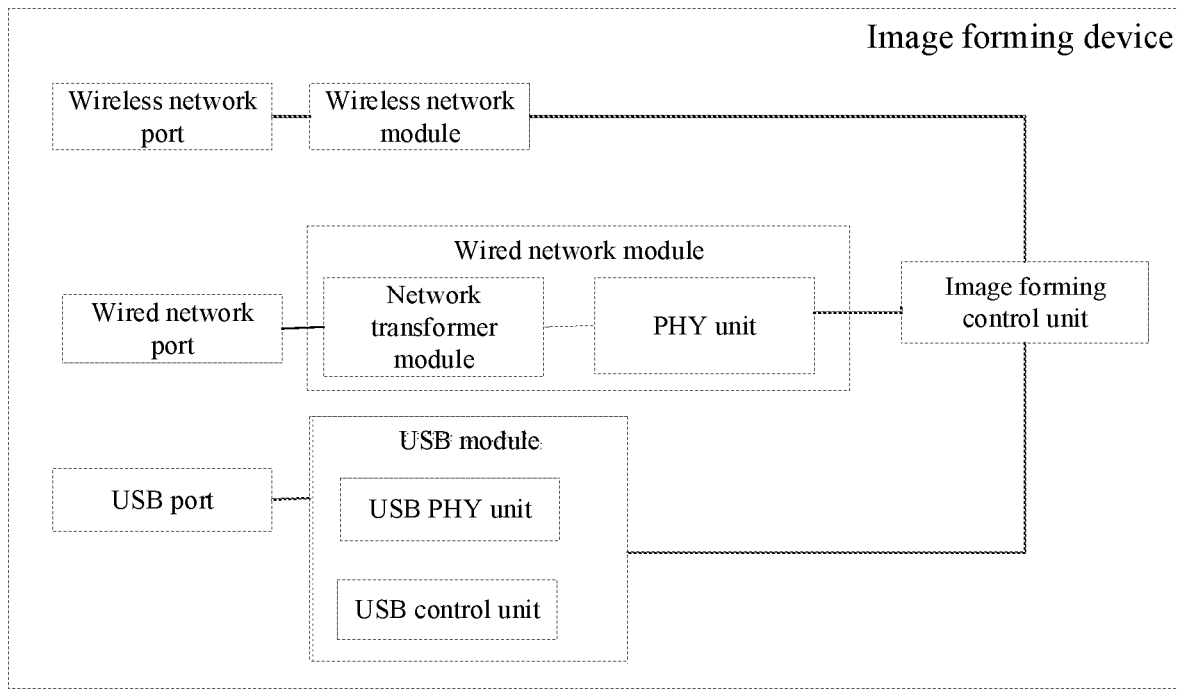

FIG. 2

Perform a forced disconnection event for a communication port in response to a satisfaction of a preset condition, the forced disconnection event including disconnecting power supply of at least one part of components of a wireless network module, disconnecting power supply of at least one part of Components of a wired network module, and force-disconnecting the USB port ⎯ S301

FIG. 3

IMAGE FORMING CONTROL METHOD AND DEVICE THEREOF, AND IMAGE FORMING DEVICE

CROSS-REFERENCE TO RELATED APPLICATION

This application claims priority to Chinese Application No. 202111122292.2, filed Sep. 24, 2021, the entire content of which is incorporated herein by reference.

TECHNICAL FIELD

The present disclosure generally relates to the image forming technology field and, more particularly, to an image forming control method and a device thereof, an image forming device, an electronic apparatus, and a non-transitory computer-readable storage medium.

BACKGROUND

In the existing technology, with the development of imaging technology, an image forming device is widely used. The image forming device commonly includes but is not limited to a printer, a copier, a scanner, a fax machine, or a multi-functional machine integrated with one or more functions of printing, copying, scanning, or faxing.

Usually, the image forming device is connected to a computer apparatus such as a PC, a tablet, a server, etc., through a USB cable or a wired/wireless network to realize communication therebetween. After receiving job data issued by the computer apparatus, the image forming device performs an image forming operation based on the job data.

However, an illegal attack is performed maliciously on the image forming device to cause the image forming device to establish an illegal communication with another computer apparatus. As such, user information is stolen through the image forming device, which causes an information security problem.

SUMMARY

Embodiments of the present disclosure provide an image forming control method, an image forming control device, a non-transitory computer storage medium, an electronic apparatus, and an image forming device to solve the information leakage problem caused by the communication established between the image forming device and the illegal computer apparatus through the illegal attack in the existing technology.

Embodiments of the present application provide an image forming control method. The method is applied to an image forming device. The image forming device includes a communication port. The communication port includes a USB port, a wired network port, and a wireless network port. The method includes performing a forced disconnection event for the communication port in response to a satisfaction of a preset condition. The forced disconnection event includes disconnecting power supply of at least one part of components of a wireless network module, disconnecting power supply of at least one part of components of a wired network module, and force-disconnecting the USB port.

Embodiments of the present disclosure provide an image forming control device. The device is included in an image forming device. The image forming device includes a communication port. The communication port includes a USB port, a wired network port, and a wireless network port. The device includes a control unit. The control unit is configured to perform a forced disconnection event for the communication port in response to a satisfaction of a preset condition. The forced disconnection event includes disconnecting power supply of at least one part of components of a wireless network module, disconnecting power supply of at least one part of components of a wired network module, and force-disconnecting the USB port.

Embodiments of the present disclosure provide an image forming device. The image forming device includes the image forming control device.

Embodiments of the present disclosure provide a non-transitory computer-readable storage medium. The non-transitory computer-readable storage medium stores a computer program that, when the computer program is executed, causes a processor to perform the image forming control method.

Embodiments of the present disclosure provide an electronic apparatus, including a memory and a processor. The memory stores program instructions. The processor is coupled with the memory and, when the program instructions being executed, configured to perform the image forming control method.

Compared with the existing technology, the technical solution at least includes the following beneficial effects.

1. A risk of stealing confidential information may be reduced by physically disconnecting an illegal connection between the image forming device and another apparatus when the preset conduction is satisfied.

2. An authority to disconnect the function of the communication port of the image forming device may be controlled to avoid a problem that the communication port of the image forming device is closed by mistake, thereby causing inconvenience to the user.

3. The information related to the disconnection of the communication port of the image forming device is recorded for subsequent tracing.

4. The communication port of the image forming device may be disconnected to effectively reduce the power consumption required to maintain the function of the communication port.

BRIEF DESCRIPTION OF THE DRAWINGS

FIG. 2 is a schematic structural diagram of an image forming device according to some embodiments of the present disclosure.

FIG. 3 is a schematic flowchart of an image forming control method according to some embodiments of the present disclosure.

DETAILED DESCRIPTION OF THE EMBODIMENTS

In order to better understand the technical solutions of the present disclosure, embodiments of the present disclosure are described in detail below in connection with the accompanying drawings.

Described embodiments are only some embodiments of the present disclosure, but not all embodiments. Based on embodiments of the present disclosure, all other embodiments obtained by those of ordinary skill in the art without creative efforts should be within the scope of the present disclosure.

In embodiments of the present disclosure, the image forming device may be configured to perform an image forming job such as generating, printing, receiving, and transmitting image data. For example, the image forming device may include an ink jet printer, a laser printer, a light-emitting diode (LED) printer, a copier, a fax machine, a scanner, a multi-functional integration machine, or a multi-functional peripheral that performs the above functions in a single apparatus. The image forming device may include an image forming control unit and an image forming unit. The image forming control unit may be configured to control the entire image forming device. The image forming unit may be configured to, based on image data, form an image on paper that is transmitted under the control of the image forming control unit.

Figure 1:
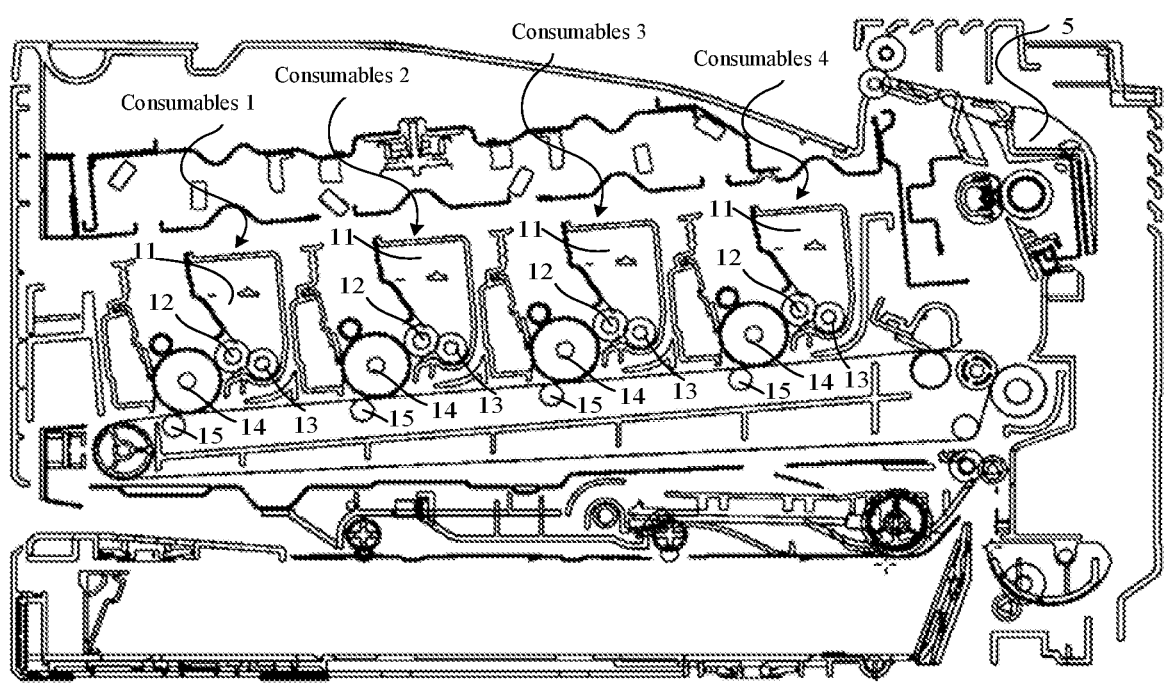
FIG. 1 is a schematic structural diagram of an image forming device according to some embodiments of the present disclosure.

FIG. 1 is a schematic structural diagram of an image forming device according to some embodiments of the present disclosure. As shown in FIG. 1, as an example of the image forming device, the image forming unit of the image forming device includes a developer accommodation member 11, a developing member 12, a developer transport element 13, a photosensitive member 14, a transfer member 15, and a fixing assembly 5. Paper that is to be printed may move in a paper-feeding direction. After a powder feeding operation of the developer transport element 13 and a developing operation of the developing member 12 in sequence, the paper may enter a clamping area between the photosensitive member 14 and the transfer member 15 for transferring. Then, the paper may be fixed by the fixing assembly 5 to complete the image forming operation.

The developer accommodation member 11 may be configured to accommodate the developer. The developer may include color toner and carbon toner. The developing member 12 may include a developing roller, which may be configured to transport the developer to a photosensitive drum. The developer transport element 13 may include a toner feeding roller, which may be configured to transport the developer to the developing member 12. The toner feeding roller may also be replaced with an element such as a toner feeding screw. The photosensitive member 14 may include a photosensitive drum (i.e., organic photoconductor (OPC)) and a charging roller. The charging roller may be configured to charge the photoconductor drum.

FIG. 2 is a schematic structural diagram of an image forming device according to some embodiments of the present disclosure. The image forming device includes an image forming control unit, a communication port, a wireless network module, a wired network module, and a USB module. The communication port includes a wireless network port, a wired network port, and a USB port.

The image forming control unit may be connected to the wireless network port through the wireless network module. The image forming control unit may be connected to the wired network port through the wired network module. The image forming control unit may be connected to the USB port through the USB module.

In some embodiments, the wired network module includes a network transformer module and a physical layer (PHY) unit. The USB module includes a USB control unit and a USB PHY unit. The USB control unit, the USB PHY unit, and the network transformer unit are well known to those skilled in the art and are not repeated here.

The USB module may also be directly integrated into the image forming control unit. Thus, the image forming control unit may be directly connected to the USB port.

Based on the image forming device, an illegal communication channel may be established with the image forming device by attacking the communication port of the image forming device by an illegal analysis. Thus, confidential information may be obtained through the image forming device, which causes an information security problem.

In order to solve the technical problem, as shown in FIG. 3, embodiments of the present disclosure provide an image forming control method, which may be executed in the image forming unit of the image forming device. The method includes the following processes.

At S301, a forced disconnection event for the communication port is performed in response to a satisfaction of a preset condition. The forced disconnection event includes disconnecting power supply of at least one part of components of the wireless network module, disconnecting power supply of at least one part of components of the wired network module, and force-disconnecting the USB port.

In some embodiments, the communication port may include the wireless network port, the wired network port, and the USB port.

In some embodiments, the forced disconnection event corresponding to the wireless network port may include disconnecting the power supply of at least one part of components of the wireless network module, including directly disconnecting the power supply of the wireless network module, or disconnecting the power supply of at least one part of components of the wireless network module.

In some embodiments, the forced disconnection event corresponding to the wired network port may include disconnecting the power supply of at least one part of components of the wired network module, including directly disconnecting the power supply of the wired network module, or disconnecting the power supply of the at least one part of components of the wired network module. In some embodiments, the at least one part of components may include the PHY unit in the wired communication module.

Force-disconnecting the USB port may be used to force-disconnect the function of the USB port of the image forming device. When the USB port is force-disconnected, another device cannot communicate with the image forming device through the USB port provided on the image forming device.

In some embodiments, when the USB module is arranged inside the image forming control unit, force-disconnecting the USB port may refer to disconnecting the connection between the image forming control unit and the USB port.

In some embodiments, when the USB module is externally arranged outside the image forming control unit, force-disconnecting the USB port may refer to disconnecting the power supply of at least some components in the USB module, including directly disconnecting the power supply of the entire USB module and disconnecting the power supply of the components of the USB module, which is not limited here.

In some embodiments, a forced disconnection instruction may be received through an operation panel of the image forming device. According to the forced disconnection instruction received, the forced disconnection event may be performed. In some embodiments, after detecting that a preset command option/operation button is triggered, the image forming device may be configured to perform the forced disconnection event, including at least one of disconnecting the power supply of at least one part of the components of the wireless network module, disconnecting the power supply of at least one part of the components of the wired network module, or force-disconnecting the USB port, which is not limited here.

In some embodiments, different preset command options/operation buttons may be arranged for the wireless network port, the wired network port, and the USB port, respectively. When a corresponding command option/operation button is triggered, the image forming device may be configured to perform the corresponding forced disconnection event on a corresponding communication port in a targeted manner. In some other embodiments, a specific option/button may also be directly arranged. Once the above option/button is triggered, the image forming device may be configured to perform the forced disconnection event for all the communication ports. The preset command options/operation buttons may also be arranged on the operation panel of the image forming device or directly on an outer surface of the image forming device, which is not limited here.

Further, before performing the corresponding forced disconnection event according to the forced disconnection instruction received by the image forming device, the image forming device may be further configured to perform a user identity verification. When a result of the user identity verification is passed, the image forming device may be configured to perform the forced disconnection event based on the forced disconnection instruction.

In some embodiments, the user identity verification may be used to verify whether a user identity attribute meets an expectation. If the user identity attribute meets the expectations, the result of the user identity verification may be passed.

The user identity attribute may include user attribute information such as biometric information of user face recognition, voice information, and fingerprint information and a user ID, and user role attribute information including a system administrator, a security administrator, and an audit administrator. The user role attribute information may also be determined based on the received user attribute information and a pre-stored correspondence between the user attribute information and the user role attribute information, which is not limited here.

In some embodiments, the image forming device may accept the forced disconnection instruction sent by the computer apparatus and perform the forced disconnection event based on the received forced disconnection instruction sent by the computer apparatus.

In some embodiments, the computer apparatus may include a tablet, a laptop, a smartphone, a server, etc.

In some embodiments, after receiving the forced disconnection instruction sent by the computer apparatus, the image forming device may perform the forced disconnection event of the corresponding port in a targeted manner or directly perform the forced disconnection events corresponding to all the communication ports.

Further, before performing the forced disconnection event according to the forced disconnection instruction sent by the computer apparatus by the image forming device, the method further includes determining whether attribute information of the computer apparatus and/or a login account corresponding to the computer apparatus and/or a security level of the computer apparatus meet an expectation, and if the expectation is met, performing the forced disconnection event.

In some embodiments, the attribute information of the computer apparatus may include information such as a MAC address of the computer apparatus, an ID of a hard disk built in the computer apparatus, and a name of the computer apparatus.

Login account information corresponding to the computer apparatus may be used to perform a user identity verification in a user login module of the computer apparatus or the image forming device. In some embodiments, the login account information may be used to verify whether the login account information itself meets a requirement and/or whether the user role attribute information corresponding to the login account meets a requirement.

The security level corresponding to the computer apparatus may include a security level assigned to the computer apparatus by another computer apparatus that is connected to the computer apparatus.

In some embodiments, the image forming device may be configured to form an audit log by recording a trigger condition related to the forced disconnection event, time when the forced disconnection event occurs, and the forced disconnection event itself.

Figure 4:
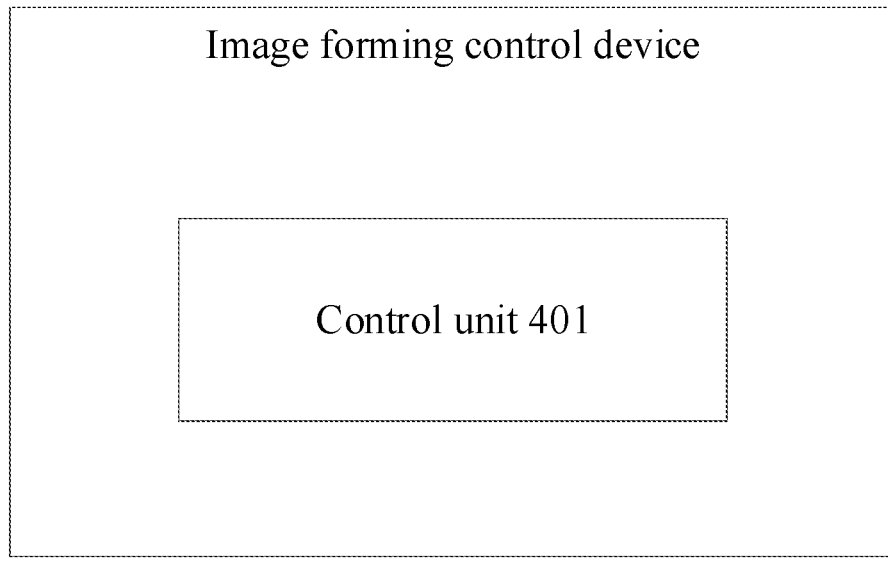
FIG. 4 is a schematic structural diagram of an image forming control device according to some embodiments of the present disclosure.

As shown in FIG. 4, embodiments of the present disclosure provide an image forming control device, which is included in the image forming device. The image forming device includes a communication port. The communication port includes a USB port, a wired network port, and a wireless network port. The image forming control device includes a control unit 401. The control unit 401 may be configured to perform the forced disconnection event on the communication port in response to a satisfaction of a preset condition to force-disconnect an event, including disconnecting the power supply of at least one part of the components of the wireless network module, disconnecting at least one part of the components of the wired network module, and force-disconnecting the USB port.

In some embodiments, the wired network module includes a PHY unit. The PHY unit may be connected to the image forming control unit. In some embodiments, the control unit 401 may be configured to disconnect the power supply of the PHY unit.

In some embodiments, when the USB module is built in the image forming control unit, the control unit 401 may be configured to disconnect the connection between the image forming control unit and the USB port in response to the satisfaction of the preset condition.

In some embodiments, when the USB module is arranged outside of the image forming control unit, the control unit 401 may be configured to disconnect the power supply of at least one part of the components of the USB module in response to the satisfaction of the preset condition.

In some embodiments, the control unit 401 may be configured to receive the forced disconnection instruction through the operation panel of the image forming device and perform the forced disconnection event.

In some embodiments, the control unit 401 may be configured to perform the user identity verification. If the verification result of the user identity verification is passed, the forced disconnection event may be performed based on the forced disconnection instruction.

In some embodiments, the control unit 401 may be configured to receive the forced disconnection instruction sent by the computer apparatus. If the attribute information of the computer apparatus and/or the login account corresponding to the computer apparatus and/or the security level of the computer apparatus meet the expectation, the forced disconnection event may be performed.

Embodiments of the present disclosure further provide a non-transitory computer-readable storage medium. The computer-readable storage medium may include a stored computer program. When the program is executed, the device where the storage medium is located may be controlled to perform any one of the image forming control methods of embodiments of the present disclosure.

Figure 5:
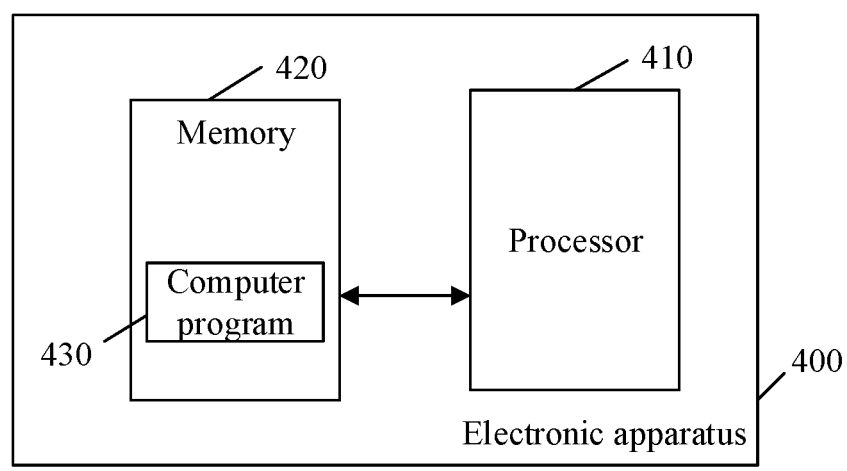
FIG. 5 is a schematic structural diagram of an electronic apparatus according to some embodiments of the present disclosure.

As shown in FIG. 5, embodiments of the present disclosure provide an electronic apparatus 400. The electronic apparatus 400 includes a memory 420 and a processor 410. The memory 420 may be used to store information including program instructions. The processor 410 may be configured to control the execution of the program instructions. When the program instructions are loaded and executed by the processor 410, the processor 410 may be configured to perform processes of the image forming control methods of embodiments of the present disclosure, which are not repeated here. In some other embodiments, when the computer program is executed by the processor 410, the processor 410 may be configured to implement the functions of the modules/units applied to the image forming control device in embodiments of the present disclosure, which are not repeated here.

Those skilled in the art may understand that FIG. 5 shows only an example of the electronic apparatus 400, which does not limit the electronic apparatus 400. The electronic apparatus 400 may include more or fewer components than the electronic apparatus shown in FIG. 5, some components may be combined, or the electronic apparatus 400 may include different components. For example, the electronic apparatus 400 may further include an input/output (I/O) apparatus, a network access apparatus, a bus, etc.

The processor 410 may include a central processing unit (CPU), another general-purpose processor, a digital signal processor (DSP), an application-specific integrated circuit (ASIC), a field-programmable gate array (FPGA), or another programmable logic device, a discrete gate or transistor logic device, a discrete hardware component, etc. The general-purpose processor may include a microprocessor, or the processor may include any conventional processor.

The memory 420 may include an internal storage unit of the electronic apparatus 400, e.g., a hard drive or a memory of the electronic apparatus 400.

The memory 420 may also include an external storage apparatus of the electronic apparatus 400, such as a plug-in hard drive, a smart media card (SMC), a secure digital (SD) card, or a flash card arranged at the electronic apparatus 400. The memory 420 may also include a memory of a server. A computer program 430 stored in the server may be transferred to another storage module inside the electronic apparatus through a network. Thus, the processor 410 may load and execute the computer program 430. Further, the memory 420 may also include both the internal storage unit of the electronic apparatus 400 and the external storage apparatus. The memory 420 may be used to store the computer program and another program and data required by the electronic apparatus 400. The memory 420 may also be used to temporarily store data that has been output or is to be output.

Those of ordinary skill in the art may realize that the units and algorithm steps of the examples described in connection with embodiments of the present disclosure may be implemented in electronic hardware, computer software, or a combination thereof. To describe the interchangeability of the hardware and software, components and steps of the examples have been generally described according to the functions. Whether these functions are performed in the hardware or the software may depend on a specific application and design constraint of the technical solution. Those skilled in the art may implement the described functions by using different methods for each specific application. However, these implementations should not be considered beyond the scope of the present disclosure.

The above are only some embodiments of the present disclosure and are not intended to limit the present disclosure. Any modifications, equivalent replacements, improvements, etc., made within the spirit and principles of the present disclosure should be within the scope of the present disclosure.

What is claimed is:

1. An image forming control method, applied to an image forming device, the image forming device including a communication port and the communication port including a Universal Serial Bus (USB) port, a wired network port, and a wireless network port, the method comprising:
    performing a forced disconnection event for the communication port in response to a satisfaction of a preset condition, the forced disconnection event including:
    disconnecting power supply of at least one part of components of a wireless network module;
    disconnecting power supply of at least one part of components of a wired network module; and
    force-disconnecting the USB port, wherein in response to a USB module being arranged outside of an image forming control unit, force-disconnecting the USB port includes disconnecting the power supply of the at least one part of components of the USB module.

2. The method according to claim 1, wherein:
    the wired network module includes a physical layer (PHY) unit, the PHY unit being connected to an image forming control unit arranged in the image forming device; and
    disconnecting the power supply of the at least one part of the components in the wired network module includes disconnecting the power supply of the PHY unit.

3. The method according to claim 1, wherein:
    in response to a USB module being arranged in an image forming control unit, force-disconnecting the USB port includes disconnecting a connection between the image forming control unit and the USB port.

4. The method according to claim 1, wherein performing the forced disconnection event in response to the satisfaction of the preset condition includes:
    in response to receiving a forced disconnection instruction through the image forming device, performing the forced disconnection event.

5. The method according to claim 4, wherein in response to receiving the forced disconnection instruction through the image forming device, performing the forced disconnection event includes:
    performing a user identity verification, and in response to a result of the user identity verification being passed, performing the forced disconnection event based on the forced disconnection instruction.

6. The method according to claim 1, wherein performing the forced disconnection event in response to the satisfaction of the preset condition includes:
    when a forced disconnection instruction sent by a computer apparatus is received, in response to attribute information of the computer apparatus and/or a login account corresponding to the computer apparatus and/or a security level of the computer apparatus satisfying an expectation, performing the forced disconnection event.

7. The method according to claim 1, further comprising:
forming an audit log by recording a trigger condition related to the forced disconnection event, time when the forced disconnection event occurs, and the forced disconnection event itself.

8. An image forming control device, included in an image forming device, the image forming device including a communication port and the communication port including a Universal Serial Bus (USB) port, a wired network port, and a wireless network port, the image forming control device comprising:
  a processor configured to perform a forced disconnection event for the communication port in response to a satisfaction of a preset condition, the forced disconnection event including:
  disconnecting power supply of at least one part of components of a wireless network module;
  disconnecting power supply of at least one part of components of a wired network module; and
  force-disconnecting the USB port, wherein in response to a USB module being arranged outside of an image forming control unit, force-disconnecting the USB port includes disconnecting the power supply of the at least one part of components of the USB module.

9. The image forming control device according to claim 8, wherein:
  the wired network module includes a physical layer (PHY) unit;
  the PHY unit is connected to an image forming control unit; and
  the processor is configured to disconnect power supply of the PHY unit.

10. The image forming control device according to claim 8, wherein:
  in response to the USB module being arranged in an image forming control unit, the processor is configured to disconnect a connection between an image forming control unit and the USB port.

11. The image forming control device according to claim 8, wherein:
  in response to the USB module being arranged outside of an image forming control unit, the processor is configured to disconnect power supply of the at least one part of components of the USB module.

12. The image forming control device according to claim 8, wherein the processor is configured to perform the forced disconnection event in response to receiving a forced disconnection instruction through the image forming device.

13. The image forming control device according to claim 12, wherein the processor is configured to:
  perform a user identity verification; and
  in response to a result of the user identity verification being passed, perform the forced disconnection event based on the forced disconnection instruction.

14. The image forming control device according to claim 8, wherein the processor is configured to:
  receive a forced disconnection instruction sent by a computer apparatus; and
  in response to attribute information of the computer apparatus and/or a login account corresponding to the computer apparatus and/or a security level of the computer apparatus satisfying an expectation, perform the forced disconnection event.

15. An image forming device comprising the image forming control device according to claim 8.

16. A non-transitory computer-readable storage medium storing a computer program that, when the computer program is executed, causes a processor to:
  perform a forced disconnection event for the communication port in response to a satisfaction of a preset condition, the forced disconnection event including:
  disconnecting power supply of at least one part of components of a wireless network module;
  disconnecting power supply of at least one part of components of a wired network module; and
  force-disconnecting a Universal Serial Bus (USB) port, wherein in response to a USB module being arranged outside of an image forming control unit force-disconnecting the USB port includes disconnecting the power supply of the at least one part of components of the USB module.

17. An electronic apparatus comprising a memory and a processor, wherein the memory stores program instructions, and the processor is coupled with the memory and, when the program instructions being executed, configured to perform the image forming control method according to claim 1.

* * * * *